US011999077B2

(12) United States Patent
Schock

(10) Patent No.: US 11,999,077 B2
(45) **Date of Patent: *Jun. 4, 2024**

(54) HYDRAULIC SYSTEM FOR STRIPPING CONCRETE FORMS

(71) Applicant: HawkeyePedershaab Concrete Technologies, Inc., Clayton, MO (US)

(72) Inventor: Nathan Schock, Mediapolis, IA (US)

(73) Assignee: HAWKEYEPEDERSHAAB CONCRETE TECHNOLOGIES, INC., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,899

(22) Filed: Mar. 10, 2023

(65) Prior Publication Data

US 2023/0211521 A1 Jul. 6, 2023

Related U.S. Application Data

(63) Continuation of application No. 16/580,701, filed on Sep. 24, 2019, now Pat. No. 11,628,594.

(51) Int. Cl.

*B28B 7/10* (2006.01)
*B28B 7/00* (2006.01)
*B28B 7/16* (2006.01)
*F04C 2/00* (2006.01)
*F04C 15/00* (2006.01)

(52) U.S. Cl.

CPC .............. *B28B 7/10* (2013.01); *B28B 7/0041* (2013.01); *F04C 2/00* (2013.01); *F04C 15/0057* (2013.01); *F04C 15/0073* (2013.01); *B28B 7/162* (2013.01)

(58) Field of Classification Search

CPC . B28B 7/10; B28B 7/0041; B28B 7/00; F04C 2/00; F04C 2/10

See application file for complete search history.

(56) References Cited

U.S. PATENT DOCUMENTS

| | | | |
|---|---|---|---|
| 4,869,660 | A | 9/1989 | Ruckstuhl |
| 6,829,867 | B2 | 12/2004 | Gresser |
| 6,997,427 | B2 | 2/2006 | Manthei |
| 7,156,645 | B2 | 1/2007 | Ness |
| 7,341,685 | B2 | 3/2008 | Hamilton |
| 10,053,832 | B2 | 8/2018 | Neill |

(Continued)

FOREIGN PATENT DOCUMENTS

| | | | |
|---|---|---|---|
| JP | 2006326944 | A * | 12/2006 |
| KR | 100518281 | B1 | 9/2005 |
| KR | 20140029206 | A | 3/2014 |

OTHER PUBLICATIONS

Innovative Conceptual Design of Manual-Concrete-Block Making-Machine, Journal Name: Innovative Systems Design and Engineering, Publication date: 2016, Authors: Diana Starovoytova Madara, Saul Sitati Namango, Daniel Arusei.

*Primary Examiner* — Nahida Sultana
*Assistant Examiner* — Virak Nguon
(74) *Attorney, Agent, or Firm* — SHUTTLEWORTH & INGERSOLL, PLC; Jason R. Sytsma

(57) ABSTRACT

A concrete form for holding a concrete product in place during a curing process with at least one side movable by a rotary driven power source and a actuator. A rotary power tool with a helical cutout combinable to a second adapter on the rotary driven power source to rotate the rotary driven power source to power the actuator and move the at least one side.

15 Claims, 5 Drawing Sheets

(56) References Cited

U.S. PATENT DOCUMENTS

| | | | | |
|---|---|---|---|---|
| 10,661,474 | B2 | 5/2020 | Kloss | |
| 2005/0109996 | A1* | 5/2005 | Razzaghi | B25F 3/00<br>254/126 |
| 2009/0016919 | A1* | 1/2009 | Mitchell | F04C 2/18<br>418/161 |
| 2021/0001412 | A1* | 1/2021 | Burgess | E21B 17/04 |

* cited by examiner

HYDRAULIC SYSTEM FOR STRIPPING CONCRETE FORMS

CROSS-REFERENCE TO RELATED APPLICATIONS

This application is a continuation of U.S. patent application Ser. No. 16/580,701 filed Sep. 24, 2019, the entirety of which is incorporated by reference herein.

TECHNICAL FIELD

This invention relates to a system for stripping concrete formwork from the concrete surface, and more specifically, this invention relates to a powered system to simplify stripping formwork.

BACKGROUND INFORMATION

In plants for manufacturing concrete products, such as slabs, blocks, culverts, pipes, etc, forms are used for wet casting. Once the wet cast sets, the forms must be removed or stripped from the product to speed up the curing process and transport the products to the field. This stripping process can be time consuming and labor intensive, especially for large products. To aide this process, a powered system is combined to the forms to strip the forms away from the material. These powered systems often need assembled and disassembled for each form.

Accordingly, there is a need for a powered system combined to the form to simplify stripping formwork.

SUMMARY

In accordance with one aspect of the present invention, a system for stripping concrete forms from a concrete product is disclosed. The system comprises of a concrete form for holding a concrete product in place during a curing process. The form can comprise at least one side movable with respect to the product to separate the concrete form from the product. In this regard, a actuator is combined to the concrete form for moving the at least one side with respect to the concrete product. A rotary driven power source is combined to the actuator for driving the actuator for moving the at least one side with respect to the concrete product. A rotary power tool can be combinable to the rotary driven power source for rotating the rotary driven power source and operating the rotary driven power source.

The rotary power tool can include a first adapter combinable to the rotary power tool and a second adapter combinable to the rotary driven power source for providing one-way rotation of the rotary driven power source to protect the rotary driven power source. The first adapter can comprise a helical cutout to prevent the second adapter and the rotary driven power source from being rotated in one direction. In this regard, the first adapter can comprise opposing flat faces to mate with the second adapter to rotate the second adapter. The second adapter can comprise opposing protruding lugs that are engaged by the opposing flat faces of the first adapter to rotate the second adapter.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
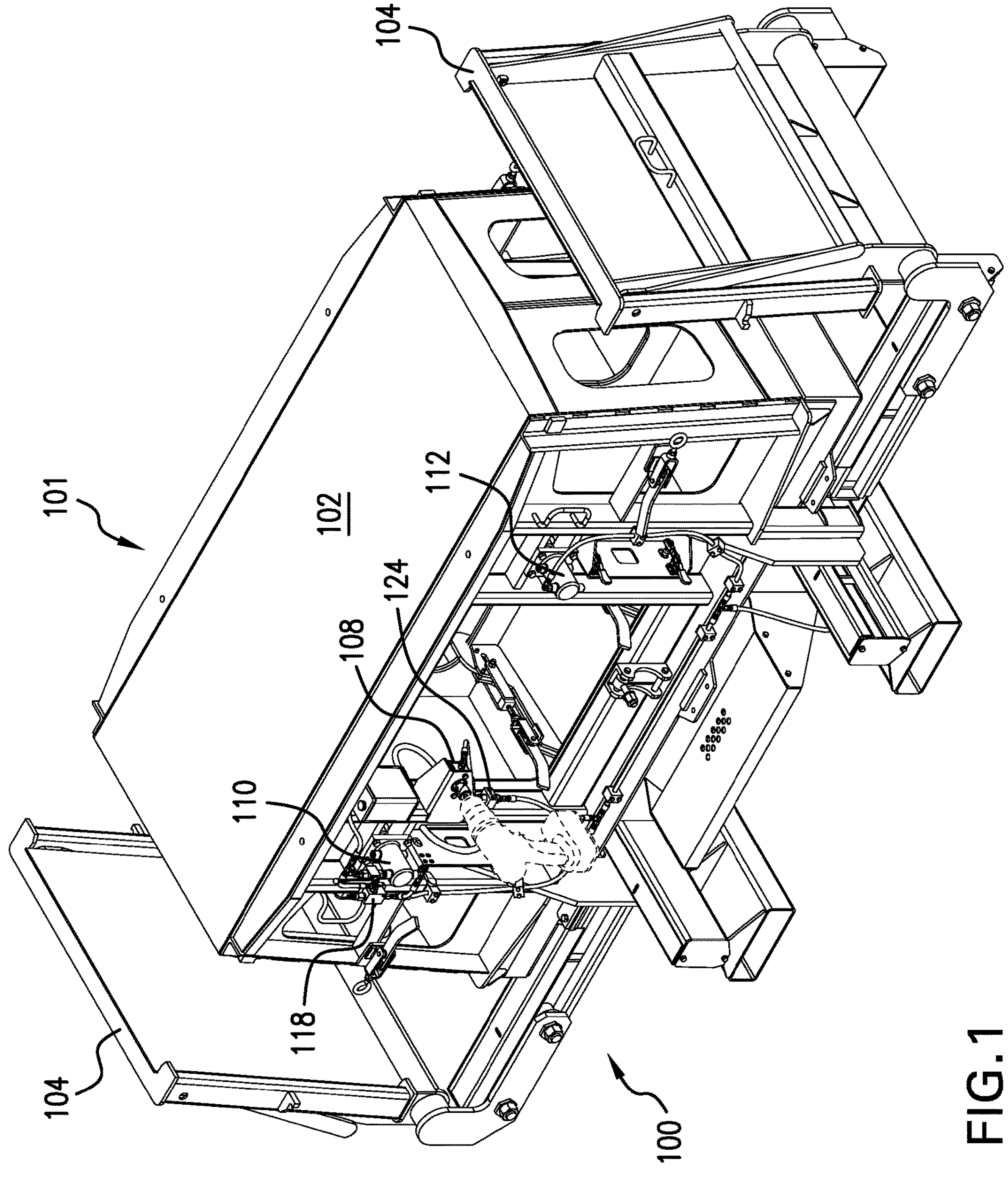
FIG. 1 is a perspective view of a system for stripping concrete forms from a concrete product.
Figure 2:
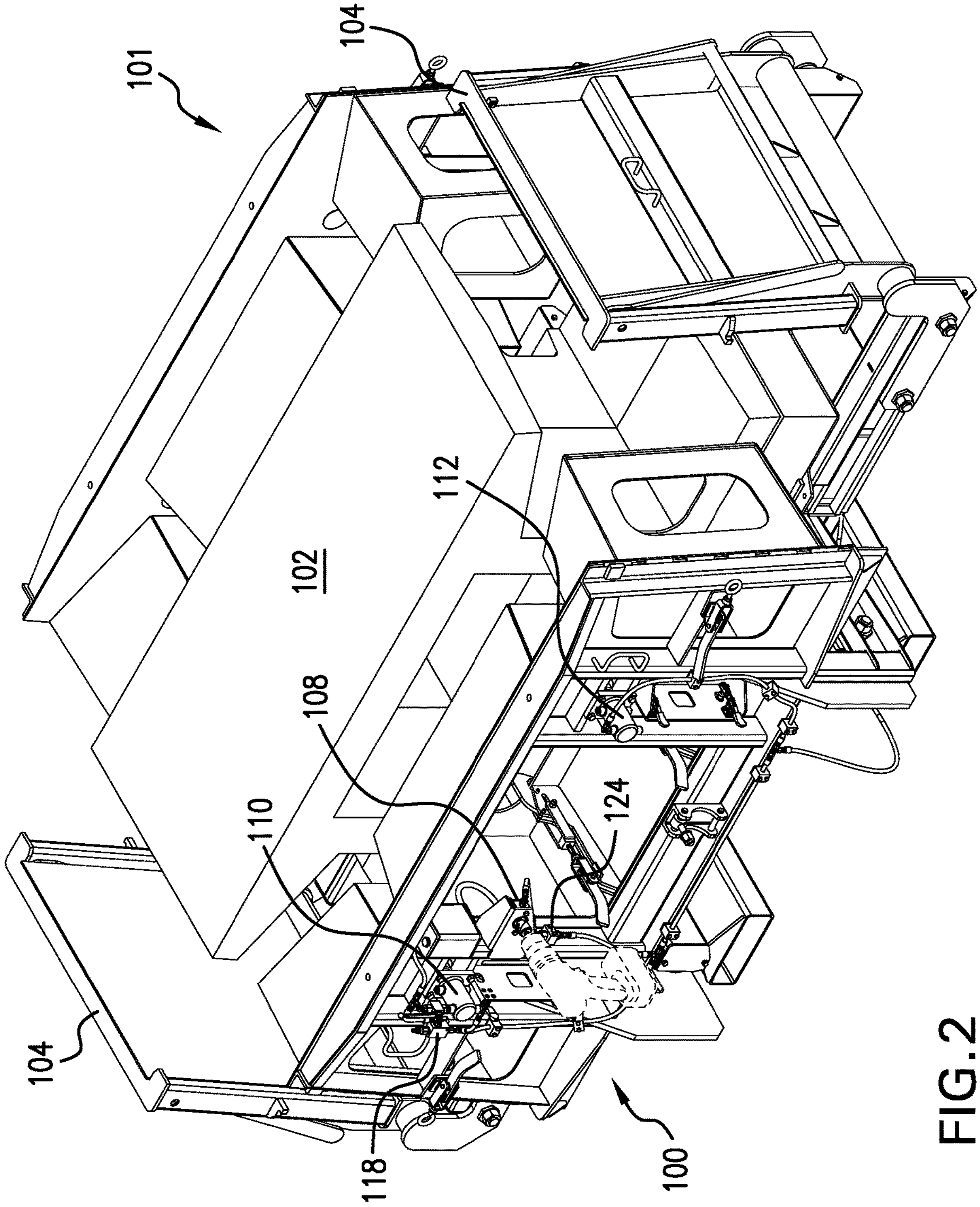
FIG. 2 is a perspective view of the system of FIG. 1 with the sides of the form stripped from the concrete product.

Referring to FIGS. 1 and 2, shown are perspective views of a system 100 for stripping a concrete form 101 from a concrete product 102. FIG. 1 shows system 100 with two lateral sides 104 of form 101 stripped from concrete product 102 and FIG. 2 shows system 100 with two lateral sides 104 and two longitudinal sides 106 stripped from concrete product 102. Form 100 is used for holding concrete product 102 in place during a curing process. Form 100 comprises of at least one side movable with respect to concrete product 102 to separate form 101 from concrete product 102. In the illustrated embodiment, concrete product 102 is shown as a barrier and concrete form comprises two lateral sides 104 and two longitudinal sides 106 that are each movable with respect to concrete product 102. One skilled in the art will recognize, that form 101 can take virtually any shape for any concrete product, and depending on the shape the number of movable sides can be modified to allow the user to strip form 100 from concrete product 102.

Figure 4:
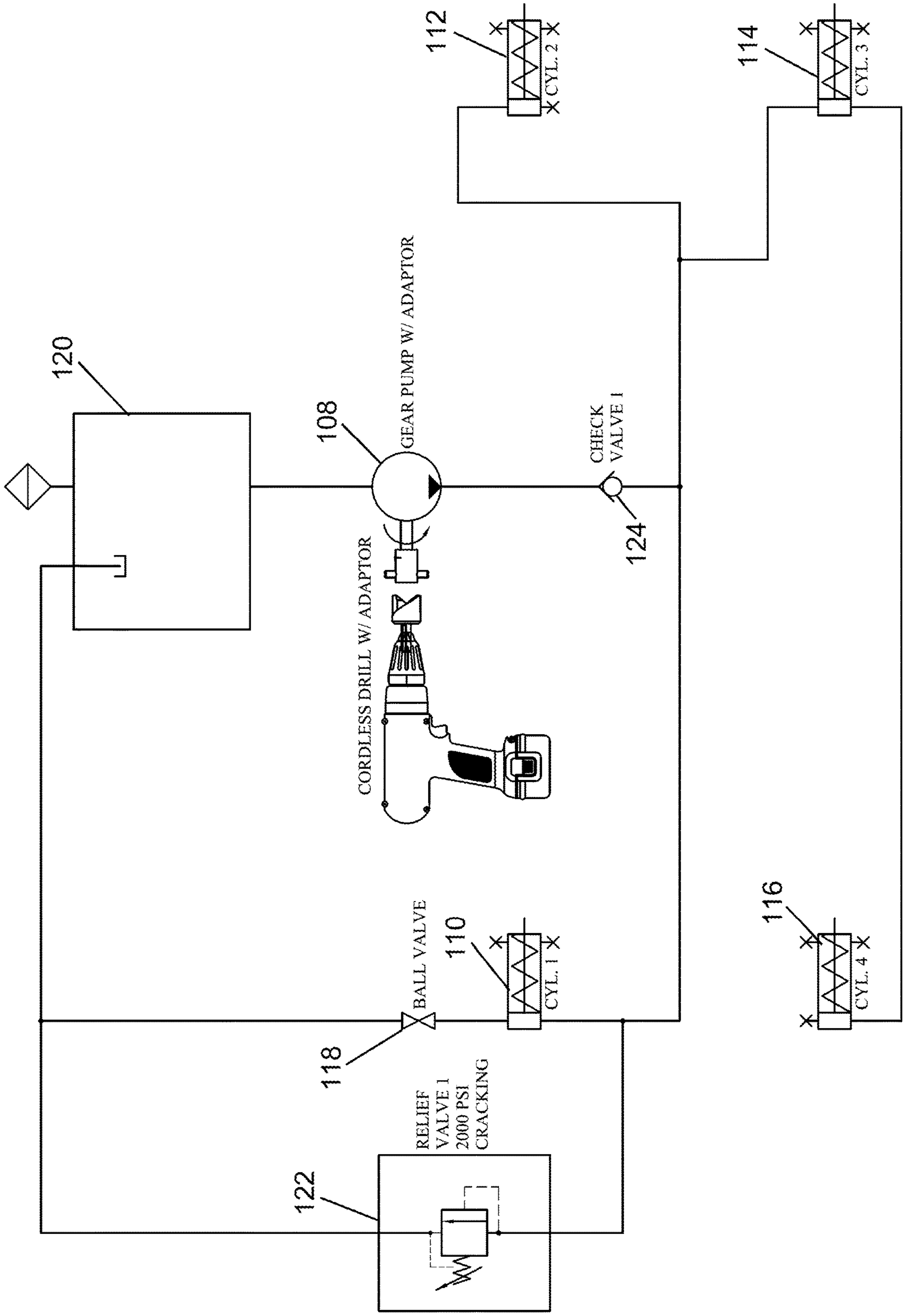
FIG. 4 is a hydraulic schematic for a system stripping the concrete forms from the concrete product.

In the illustrated embodiment, system 100 is implemented as a hydraulic system with actuators. One skilled in the art will recognize that system 100 can be implemented as a pneumatic or electrically driven system, as well. One skilled in the art will also recognize that actuators can include valves or linear or rotary actuators, such as cylinders, solenoids, or diaphragms. Turning to FIG. 4, system 100 comprises of a rotary driven power source 108 that converts rotary motion into hydraulic energy used to pressurize a first actuator 110, a second actuator 112, a third actuator 114, and a fourth actuator 116. First actuator 110 and second actuator 112 are connected in parallel and once pressurized by rotary driven power source 108, strip concrete form 100 by moving two longitudinal sides 106 away from concrete product 102. Third actuator 114 and fourth actuator 116 are also connected in parallel with first actuator 110 and second actuator 112, and once pressurized by rotary driven power source 108, strip concrete form 100 by moving two lateral sides 104 away from concrete product 102.

Each of first actuator 110, second actuator 112, third actuator 114, and fourth actuator 116 are designed with internal springs so that upon release of hydraulic pressure in system 100 the pistons retract to close form 101 for making the next product.

System 100 comprises of a ball valve 118, which is series connected with a reservoir 120. Ball valve 118 is a manually operated on/off control for system 100. In order to operate system 100, ball valve 118 must first be manually closed by operator so the respective first actuator 110, second actuator 112, third actuator 114, and fourth actuator 116 can be pressurized. If during operation, the pressure inside system 100 needs released, the operator can manually open ball valve 118 to dump the hydraulic fluid into reservoir 120 to relieve the pressure in system 100.

System 100 is protected from over pressure by a relief valve 122. If the pressure inside system 100 exceeds a predetermined amount, relief valve is automatically opened to dump hydraulic fluid into reservoir 120 and relieve pressure. System 100 can also include a check valve 124 to protect rotary driven power source 108 from back flow.

Figure 5:
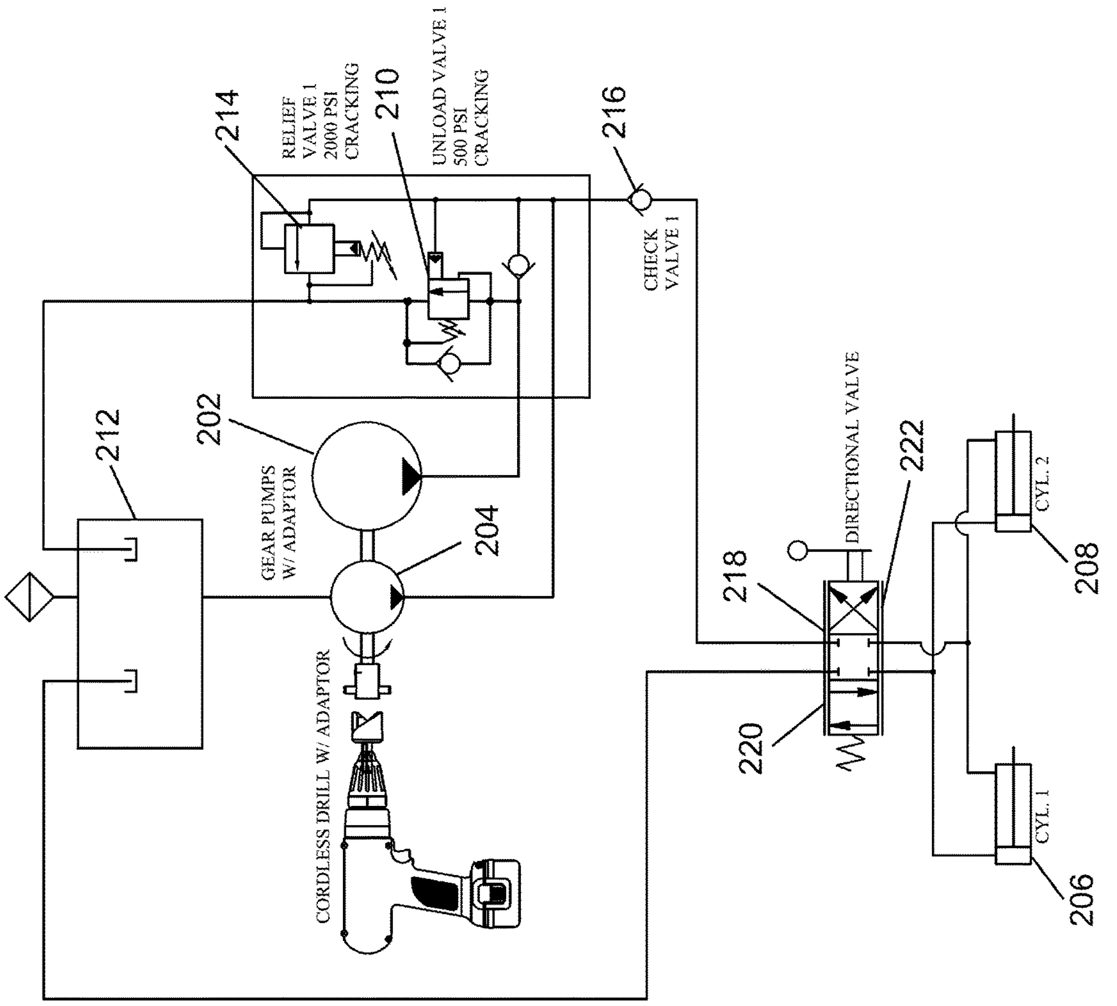
FIG. 5 is another hydraulic schematic for a system for stripping the concrete forms from the concrete product.

FIG. 5 is another hydraulic schematic for a system 200 for stripping concrete form 100 from concrete product 102. System 200 comprises of a first rotary driven power source 202 and a second rotary driven power source 204 that each convert rotary motion into hydraulic energy used to pressurize a first actuator 206 and a second actuator 208. First actuator 206 and second actuator 208 are connected in parallel and once pressurized by first rotary driven power source 202 and second rotary driven power source 204 strip concrete form 100 by moving two longitudinal sides 106 away from concrete product 102. Similar to system 100, additional actuators can be provided.

The purpose for having first rotary driven power source 202 and second rotary driven power source 204 is for applying a high pressure but low flow to break the bond between concrete form 100 and concrete product 102, and then low pressure at a higher flow once the need for high pressure is no longer required. Before the bond is broken or anytime the required pressure exceeds a predetermine amount, which can be five hundred (500) psi (or any other value greater than or less than depending on the size of the rotary driven power source), an unload valve 210 opens to dump hydraulic fluid into reservoir 212 and relieve pressure and disconnect first rotary driven power source 202 from the circuit. When first rotary driven power source 202 is disconnected from the circuit, there can be a check valve 224 to prevent high pressure output from second rotary driven power source 204 from being dumped through unload valve 210. Second rotary driven power source 204 continues to operate and actuate first actuator 206 and second actuator 208. Second rotary driven power source 204 is protected from over pressure by a relief valve 214. If the pressure inside system 200 exceeds a predetermined amount, relief valve 214 is automatically opened to dump hydraulic fluid into reservoir and relieve pressure. System 200 can also include a check valve 216 to protect first rotary driven power source 202 and second rotary driven power source 204 from back flow.

System 200 can comprise a directional valve 216 with three positions. A first position 218 can comprise a closed position where first actuator 206 and second actuator 208 are isolated from first rotary driven power source 202 and second rotary driven power source 204. Directional valve can contain a second position 220 where first rotary driven power source 202 and second rotary driven power source 204 are directly connected to actuator 206 and second actuator 208 to strip concrete form 100 from concrete product 102. Directional valve 216 can comprise a third position 222 that reverses the flow of hydraulic fluid to first actuator 206 and second actuator 208 to reverse the direction first actuator 206 and second actuator 208 to retract their respective pistons.

Figure 3:
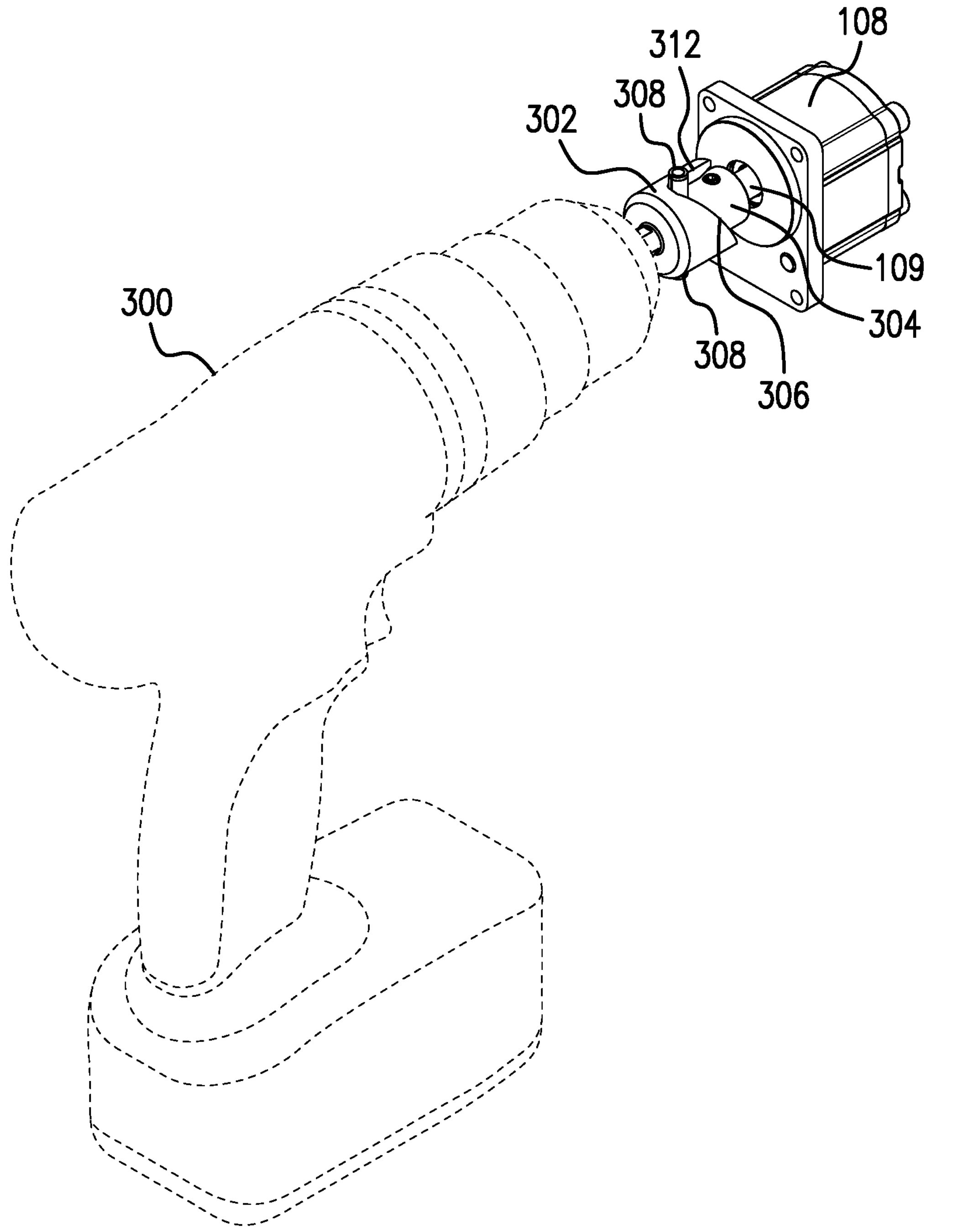
FIG. 3 is a perspective view of a rotary power tool and adapters for operating the power source for stripping the concrete forms from the concrete product.

In an embodiment, the rotary driven power sources are operated manually by a rotary power tool 300 (as shown in FIG. 3). Rotary driven power source 108 of system 100 is shown though it should be recognized that the following description applies equally to first rotary driven power source 202 and second rotary driven power source 204 of system 200. Rotary power tool 300 can be a cordless drill or any other type of rotary power tool 300 that can apply rotary motion to drive rotary driven power sources.

Rotary power tool 300 is attachable to a transmission shaft 109 of rotary driven power source 108 for rotating transmission shaft 109 and operating rotary driven power source 108. A first adapter 302 can be combinable to rotary power tool 300 and a second adapter 304 can be combinable to transmission shaft 109 of rotary driven power source 108 for providing one-way rotation of transmission shaft 109 of rotary driven power source 108 to protect rotary driven power source 108 from being driven in the wrong direction. First adapter 302 can comprise a helical cutout 306 with opposing flat faces 312 to mate with second adapter 304 comprising opposing protruding lugs 308. Flat faces 312 of first adapter 302 can abut against opposing protruding lugs 308 of second adapter 304 to rotate transmission shaft 109 in one direction but, if rotated in the opposite direction, helical cutout 306 of first adapter 302 prevents engagement of second adapter 304 to rotate transmission shaft 109.

Those skilled in the art will recognize that the rotary driven power sources described herein can be implemented as rotary pumps (either hydraulic, pneumatic, electric or any combination thereof).

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A system for breaking a bond between a concrete form and a concrete product with a rotary power tool, wherein the concrete form holds the concrete product in place during a curing process, wherein the concrete form comprises of at least one portion movable with respect to the concrete product to break the bond between concrete product and the concrete form, the system comprising:

an actuator combined to the concrete form for moving the at least one portion of the concrete form with respect to the concrete product;

a rotary driven power source combined to the actuator for driving the actuator for moving the at least one portion of the concrete form with respect to the concrete product;

a first adapter combinable to the rotary power tool, the first adapter comprising an outer surface, an inner surface, a top surface normal to an axis of rotation connecting the outer surface and the inner surface, two opposing flat faces that are each perpendicular to the axis of rotation and extend axially downward from the top surface and two helical cutouts each beginning at the bottom of a flat face of the two opposing flat faces and extending to the top surface; and a second adapter combinable to the rotary driven power source.

2. The system of claim 1, wherein the rotary driven power source is a rotary pump comprising of a transmission shaft for operating the rotary pump.

3. The system of claim 2, and further comprising a rotary power tool combinable to the transmission shaft of the rotary pump for rotating the transmission shaft and operating the rotary pump.

4. The system of claim 3, wherein the first adapter is combinable to the rotary power tool and the second adapter is combinable to the transmission shaft of the rotary pump for providing one-way rotation of the transmission shaft of the rotary pump to protect the pump.

5. The system of claim 4, wherein the first adapter comprises the helical cutout to prevent the second adapter and the transmission shaft from being rotated in one direction.

6. A system for stripping concrete forms from a concrete product, the system comprising:

a concrete form for holding a concrete product in place during a curing process, wherein the concrete form comprises of at least one side movable with respect to the product to separate the concrete form from the product;

an actuator combined to the concrete form for moving the at least one side with respect to the concrete product; and a rotary driven power source combined to the actuator for driving the actuator for moving the at least one side with respect to the concrete product;

a second adapter combinable to the rotary driven power source;

a first adapter combinable to the second adapter, the first adapter comprising an outer surface, an inner surface, a top surface normal to an axis of rotation connecting the outer surface and the inner surface, two opposing flat faces that are each perpendicular to the axis of rotation and extend axially downward from the top surface, and two helical cutouts each beginning at the bottom of a flat face of the two opposing flat faces and extending to the top surface, wherein the first adapter is drivable by a rotary power tool.

7. The system of claim 6, and further comprising a rotary power tool combinable to the rotary driven power source via the first adapter and the second adapter for rotating the rotary driven power source and operating the rotary driven power source.

8. The system of claim 7, wherein the first adapter is combinable to the rotary power tool and the second adapter is combinable to the rotary driven power source for providing one-way rotation of the rotary driven power source to protect the rotary driven power source.

9. The system of claim 8, wherein the first adapter comprises a helical cutout to prevent the second adapter and the rotary driven power source from being rotated in one direction.

10. The system of claim 9, wherein the first adapter comprises opposing flat faces to mate with the second adapter to rotate the second adapter.

11. The system of claim 10, wherein the second adapter comprises opposing protruding lugs that are engaged by the opposing flat faces of the first adapter to rotate the second adapter.

12. A system for breaking a bond between a concrete form and a concrete product that is at least partially cured in the concrete form using a rotary driven power tool, wherein the concrete form comprises at least one actuator for moving a portion of the concrete form with respect to the concrete product, the system comprising:

a rotary driven power source combinable to the actuator for driving the actuator to move the portion of the concrete form with respect to the concrete product to break the bond between the concrete form and the concrete product;

a first adapter combinable to a rotary power tool, the first adapter comprising an outer surface, an inner surface, a top surface normal to an axis of rotation connecting the outer surface and the inner surface, two opposing flat faces that are each perpendicular to the axis of rotation and extend axially downward from the top surface, and two helical cutouts each beginning at the bottom of a flat face of the two opposing flat faces and extending to the top surface; and a second adapter combinable to a rotary driven power source.

13. The system of claim 12, wherein the second adapter comprises opposing protruding lugs that are engaged by the opposing flat faces of the first adapter to rotate the second adapter.

14. The system of claim 12, and further comprising a directional control valve in fluid communication with the rotary driven power source.

15. The system of claim 14, further comprising an unload valve in fluid communication with the power source and a reservoir in fluid communication with the unload valve for relieving pressure and disconnecting the rotary driven power source.

* * * * *